(12) United States Patent
Sexton

(10) Patent No.: US 8,312,631 B2
(45) Date of Patent: Nov. 20, 2012

(54) BEARING ASSEMBLY INCLUDING AT LEAST ONE SUPERHARD BEARING ELEMENT HAVING AT LEAST ONE REGISTRATION FEATURE, BEARING APPARATUS INCLUDING SAME, AND METHODS FOR MAKING SAME

(75) Inventor: Timothy N. Sexton, Santaquin, UT (US)

(73) Assignee: US Synthetic Corporation, Orem, UT (US)

( * ) Notice: Subject to any disclaimer, the term of this patent is extended or adjusted under 35 U.S.C. 154(b) by 470 days.

(21) Appl. No.: 12/536,178

(22) Filed: Aug. 5, 2009

(65) Prior Publication Data

US 2010/0288558 A1 Nov. 18, 2010

Related U.S. Application Data

(60) Provisional application No. 61/178,152, filed on May 14, 2009.

(51) Int. Cl.
*B21D 53/10* (2006.01)
(52) U.S. Cl. .................................................. 29/898.07
(58) Field of Classification Search ................... 29/898, 29/898.07; 175/92
See application file for complete search history.

(56) References Cited

U.S. PATENT DOCUMENTS

| 4,345,798 | A | 8/1982 | Cortes |
| 4,410,054 | A | 10/1983 | Nagel et al. |
| 4,560,014 | A | 12/1985 | Geczy |
| 4,620,601 | A | 11/1986 | Nagel |
| 5,364,192 | A | 11/1994 | Damm et al. |
| 5,480,233 | A | 1/1996 | Cunningham |
| 2004/0190804 | A1 | 9/2004 | John et al. |
| 2004/0223676 | A1 | 11/2004 | Pope et al. |
| 2007/0046120 | A1 | 3/2007 | Cooley et al. |
| 2007/0081749 | A1 | 4/2007 | Sexton et al. |

FOREIGN PATENT DOCUMENTS

| WO | 94/07043 A1 | 3/1994 |
| WO | 2009/007044 A2 | 1/2009 |

OTHER PUBLICATIONS

International Search Report and Written Opinion, mailed Jul. 16, 2010, as issued in connection with corresponding Patent Application No. PCT/US2010/031837, filed on Apr. 21, 2010.

*Primary Examiner* — David Bryant
*Assistant Examiner* — Moshe Wilensky
(74) *Attorney, Agent, or Firm* — Workman Nydegger

(57) ABSTRACT

Embodiments of the invention relate to a bearing assembly including at least one superhard bearing element having at least one bearing registration feature configured to facilitate orientating of a curved, pre-machined bearing surface thereof with respect to a bearing body, methods of fabricating such bearing assemblies, and bearing apparatuses incorporating such bearing assemblies. Subterranean drilling systems incorporating such bearing assemblies are also disclosed.

22 Claims, 12 Drawing Sheets

BEARING ASSEMBLY INCLUDING AT LEAST ONE SUPERHARD BEARING ELEMENT HAVING AT LEAST ONE REGISTRATION FEATURE, BEARING APPARATUS INCLUDING SAME, AND METHODS FOR MAKING SAME

CROSS-REFERENCE TO RELATED APPLICATION(S)

This application claims the benefit of U.S. Provisional Application No. 61/178,152 filed on 14 May 2009, the disclosure of which is incorporated herein, in its entirety, by this reference.

BACKGROUND

Subterranean drilling systems that employ downhole drilling motors are commonly used for drilling boreholes in the earth for oil and gas exploration. FIG. 1 is a schematic side cutaway view of a prior art subterranean drilling system 100. The subterranean drilling system 100 includes a housing 102 enclosing a downhole drilling motor 104 that is operably connected to an output shaft 106. A radial bearing apparatus 108 is also operably coupled to the downhole drilling motor 104. A rotary drill bit 112 that is configured to engage a subterranean formation and drill a borehole is connected to the output shaft 106. As the borehole is drilled, pipe sections may be connected to the subterranean drilling system 100 to form a drill string capable of progressively drilling the borehole to a greater depth within the earth.

The radial bearing apparatus 108 includes a stationary bearing assembly 116 that does not rotate and a rotating bearing assembly 118 that is attached to the output shaft 106 and rotates with the output shaft 106. The stationary bearing assembly 116 and rotating bearing assembly 118 each includes a plurality of bearing elements 120 that may be fabricated from polycrystalline diamond compacts ("PDCs") that provide diamond bearing surfaces that bear against each other during use.

In operation, high-pressure drilling fluid is circulated through the drill string and power section (not shown) of the downhole drilling motor 104, usually prior to the rotary drill bit 112 engaging the bottom of the borehole, to generate torque and rotate the output shaft 106 and the rotary drill bit 112 attached to the output shaft 106.

The stresses born by the bearing elements 120 of the radial bearing apparatus 108 are extremely large. Therefore, manufacturers and users of subterranean drilling systems continue to seek cost-effective and suitable manufacturing techniques for fabricating bearing elements with a high durability.

SUMMARY

Embodiments of the invention relate to a bearing assembly including at least one superhard bearing element having at least one bearing registration feature configured to facilitate orientating a curved, preformed bearing surface thereof with respect to a bearing body, methods of fabricating such bearing assemblies, and bearing apparatuses incorporating such bearing assemblies. Subterranean drilling systems incorporating such bearing assemblies are also disclosed.

In an embodiment, a method for forming a bearing assembly is disclosed. The method includes forming a curved bearing surface on at least one of a plurality of superhard bearing elements. The method further includes mounting the plurality of superhard bearing elements to a bearing body. In a further embodiment, the method may include, while the plurality of superhard bearing elements are mounted to the bearing body, removing material from at least one of the plurality of superhard bearing elements to form a finished curved bearing surface thereon.

In an embodiment, a bearing assembly includes a plurality of superhard bearing elements. At least one of the superhard bearing elements includes a superhard table bonded to a substrate. The superhard table includes a curved bearing surface and defines a generally circular periphery. The substrate at least partially defines at least one bearing registration feature. The bearing assembly further includes a bearing body including at least one bearing-body registration feature configured to correspond to the geometry of the at least one bearing registration feature. The at least one bearing registration feature is in substantial registry with the at least one bearing-body registration feature.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to a bearing assembly including at least one superhard bearing element having at least one bearing registration feature configured to facilitate orientating a curved, preformed bearing surface thereof with respect to a bearing body, methods of fabricating such bearing assemblies, and bearing apparatuses incorporating such bearing assemblies. Subterranean drilling systems incorporating such bearing assemblies are also disclosed.

Figure 1:
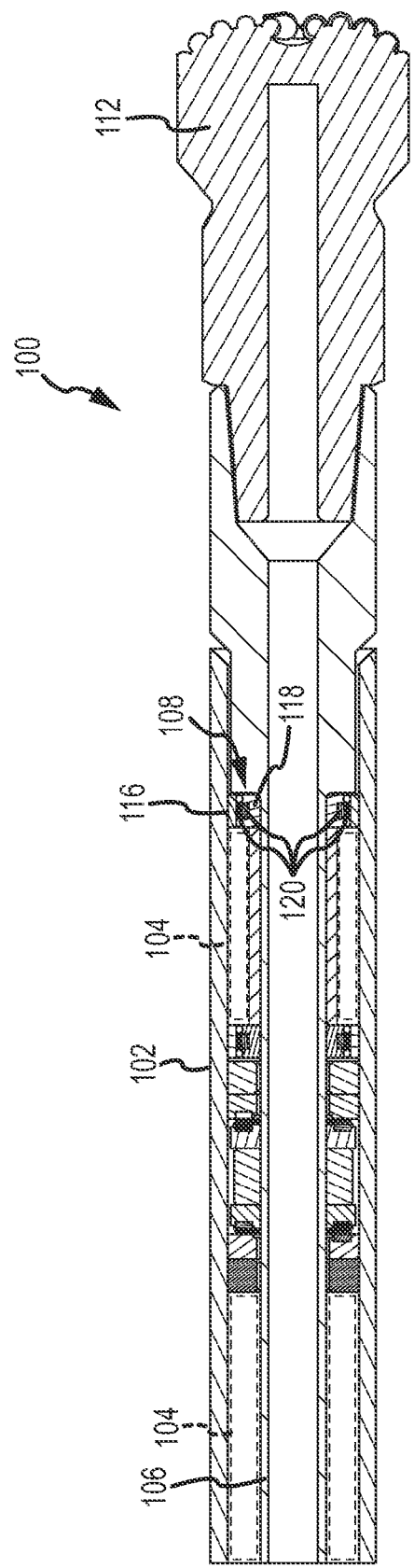
FIG. 1 is a side cross-sectional view of a prior art subterranean drilling system including at least one radial bearing apparatus.
Figure 2A:
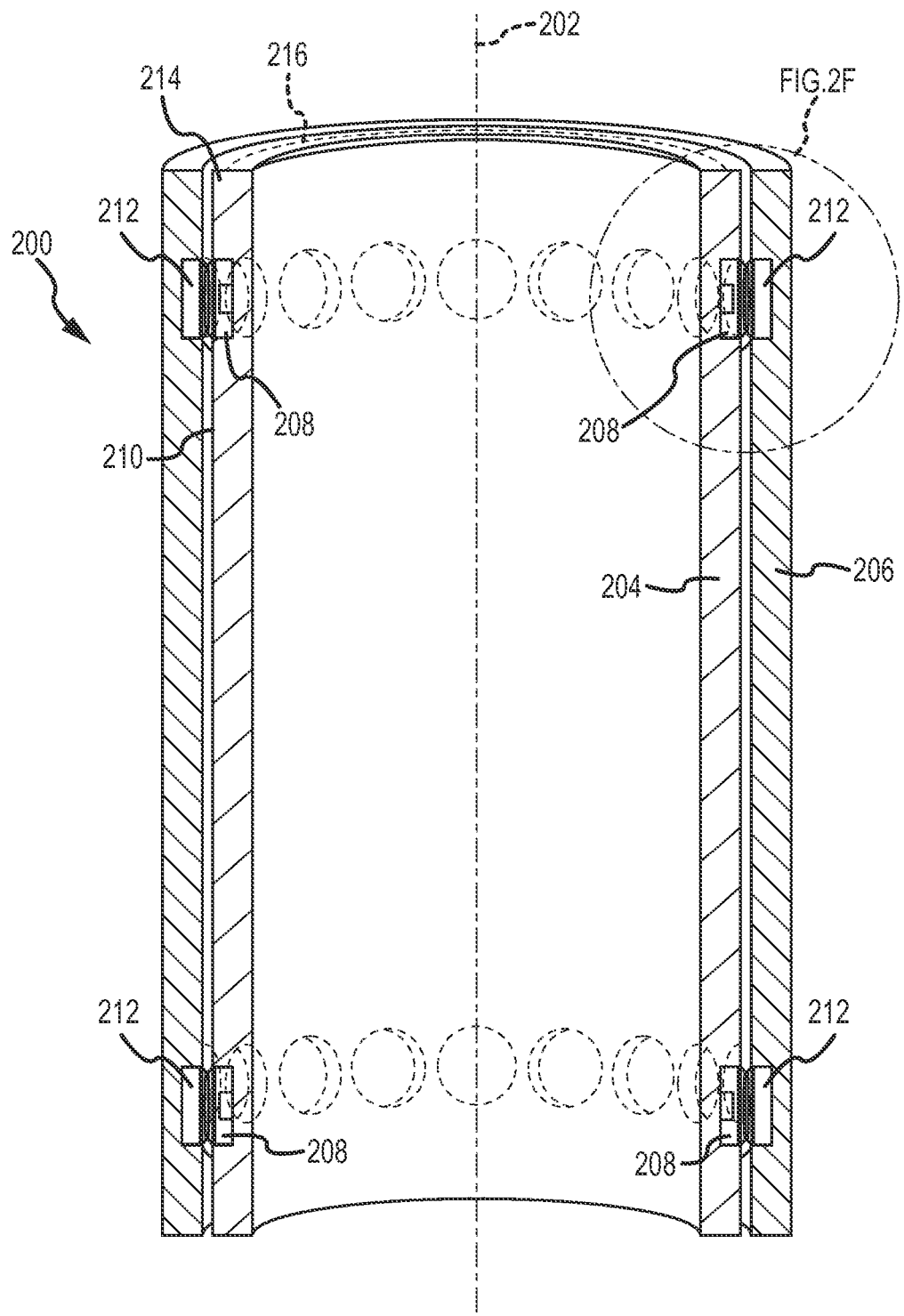
FIG. 2A is an isometric cutaway view of a radial bearing apparatus according to an embodiment.
Figure 2B:
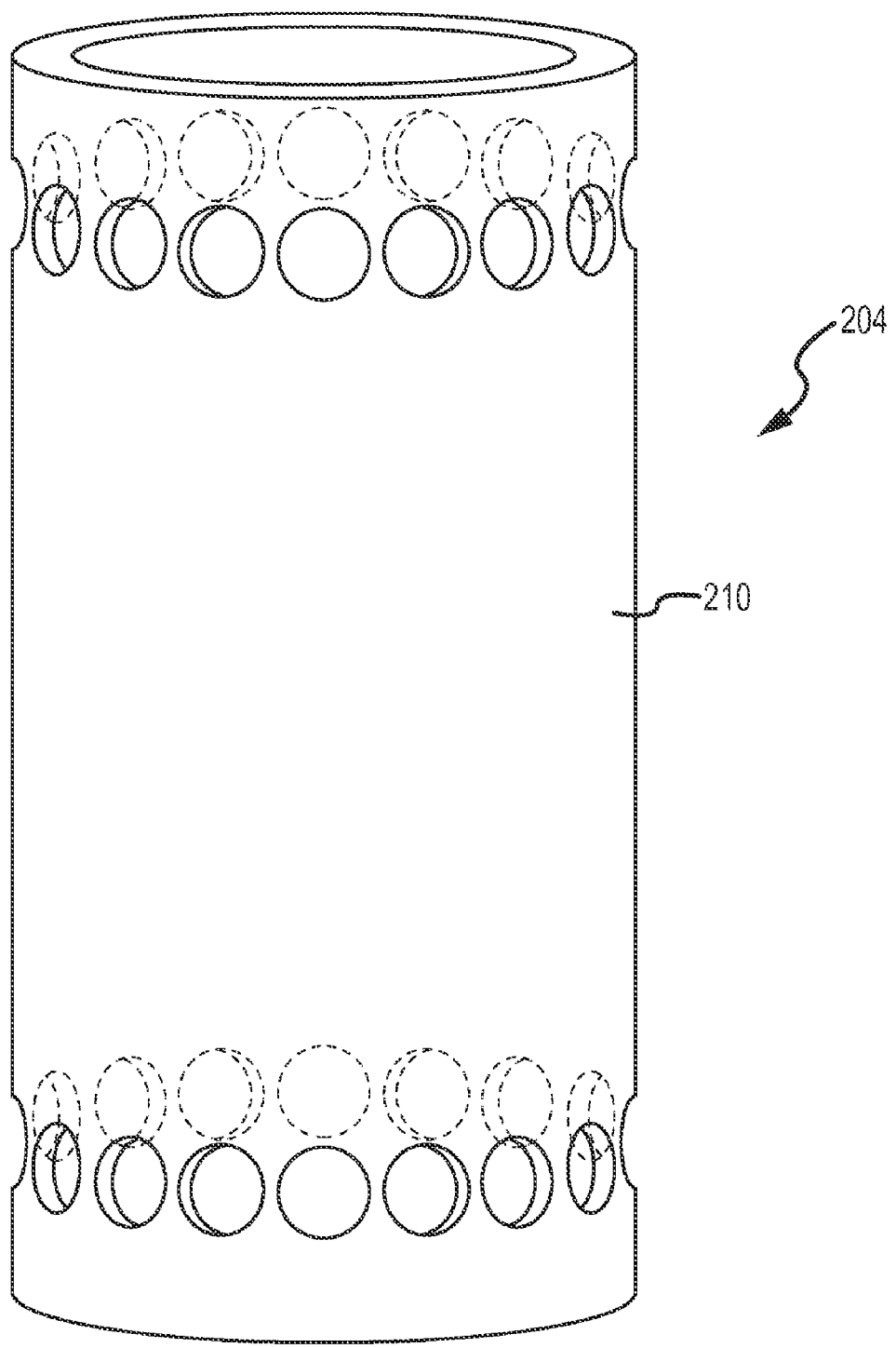
FIG. 2B is an isometric view of an inner bearing body of the bearing assembly shown in FIG. 2A according to an embodiment.
Figure 2C:
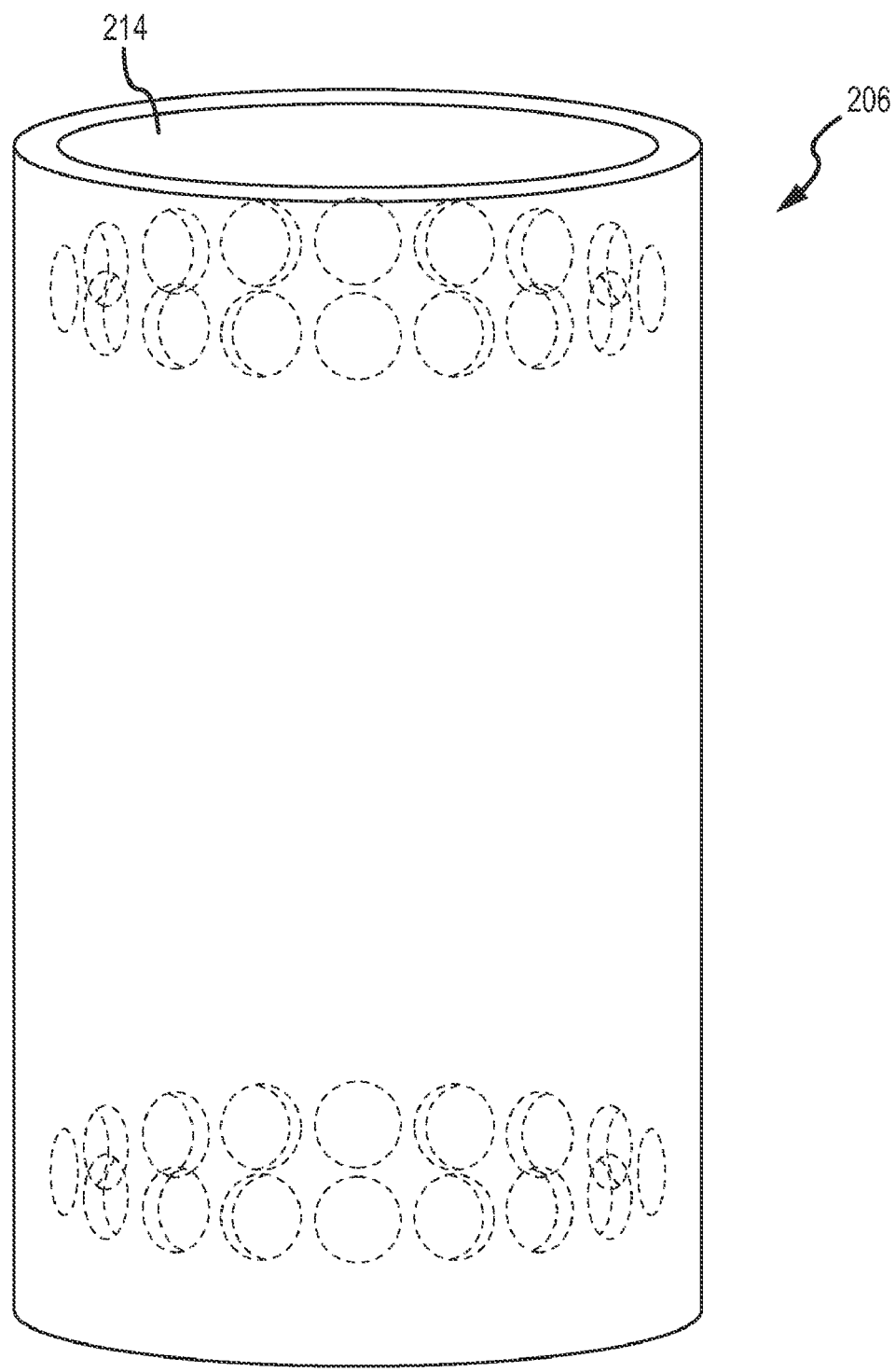
FIG. 2C is an isometric view of an outer bearing body of the bearing assembly shown in FIG. 2A according to an embodiment.

FIGS. 2A-2C illustrate a radial bearing apparatus 200, for use in a subterranean drilling system, according to an embodiment. The radial bearing apparatus 200 includes an inner bearing body 204 and an outer bearing body 206. In the illustrated embodiment, the inner bearing body 204 is located concentrically within the outer bearing body 206. In the illustrated embodiment, the inner bearing body 204 rotates (i.e., a rotating bearing body) and the outer bearing body 206 is stationary (i.e., a stationary bearing body). However, in some embodiments, the bearing body 204 may be a stationary bearing body and the bearing body 206 may be a rotating bearing body. The bearing body 204 and bearing body 206 may be ring shaped and generally centered on an axis of rotation 202.

A plurality of superhard bearing elements 208 may be secured to the bearing body 204 to form a radial bearing assembly, such as a rotating radial bearing assembly. For example, the superhard bearing elements 208 may be secured to the bearing body 204 by brazing, soldering, shrink-fitting, press-fitting, gluing, or another suitable joining technique. The superhard bearing elements 208 project radially outward from an outer cylindrical surface 210 of the bearing body 204. A plurality of superhard bearing elements 212 may be brazed to the bearing body 206 to form a radial bearing assembly, such as a stationary radial bearing assembly. The superhard bearing elements 212 project radially inward from an inner cylindrical surface 214 of the bearing body 206. The superhard bearing elements 208 may engage the superhard bearing elements 212 generally along a reference circle 216 (FIG. 2A) located between the outer cylindrical surface 210 and the inner cylindrical surface 214.

Figure 2D:
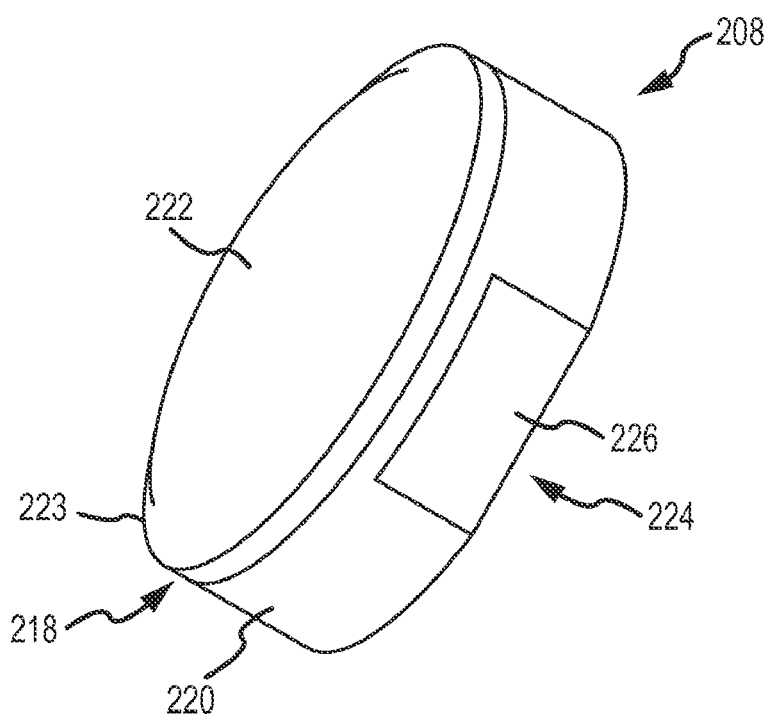
FIG. 2D is an isometric view of a superhard bearing element suitable for mounting within the inner bearing body of FIG. 2B according to an embodiment.
Figure 2E:
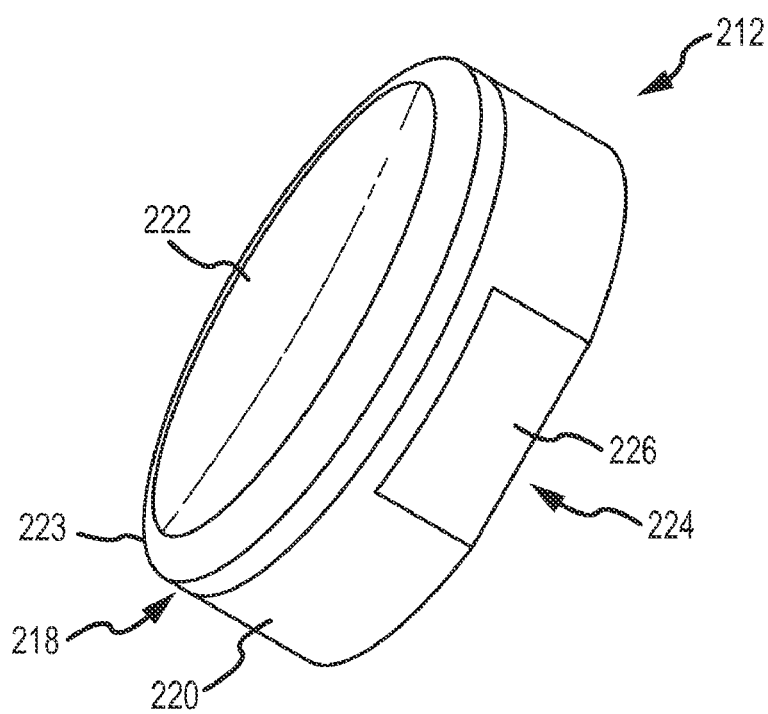
FIG. 2E is an isometric view of a superhard bearing element suitable for mounting within the outer bearing body of FIG. 2C according to an embodiment.

Referring to FIGS. 2D and 2E, in an embodiment, each of the superhard bearing elements 208, 212 may be configured as a superhard compact that includes a superhard table 218 of superhard material bonded to a substrate 220. The superhard table 218 includes a bearing surface 222 and defines a generally circular periphery 223 that extends circumferentially about the bearing surface 222. The bearing surface 222 of the superhard bearing elements 208 may be a convex curved surface (e.g., a generally cylindrical or a generally spherical surface), as shown in FIG. 2D, and the bearing surface 222 of the superhard bearing elements 212 may be a concave curved surface (e.g., a generally cylindrical or a generally spherical surface), as shown in FIG. 2E, curved to correspond to the curvature of the convex curved surface.

In an embodiment, the superhard bearing elements 208 and 212 may each be a PDC including a superhard table 218 bonded to a substrate 220. The term "superhard," as used herein, means a material having a hardness at least equal to a hardness of tungsten carbide. For example, the superhard table 218 may comprise polycrystalline diamond and the substrate 220 may comprise cobalt-cemented tungsten carbide or other carbide material. The superhard table 218 may also comprise other suitable superhard materials, such as silicon carbide, a diamond-silicon carbide composite, polycrystalline cubic boron nitride, polycrystalline cubic boron nitride and polycrystalline diamond, or another suitable superhard material or combination of superhard materials.

One or more bearing registration features 224 may be formed on or in the substrate 220, and/or the superhard table 218 of at least one of, a portion of, or all of the superhard bearing elements 208, 212. The bearing registration feature 224 enables at least substantial alignment of respective axes of curvature of the curved bearing surfaces 222 of the superhard bearing elements 208, 212 with the axis of rotation 202 (FIG. 2A) so that the superhard bearing elements 208, 212 may be installed on the bearing bodies 202, 204 with a suitable orientation so that the respective axes of curvatures of the curved bearing surfaces 222 are substantially parallel to the axis of rotation 202 (FIG. 2A). In the illustrated embodiment, the bearing registration feature 224 is embodied as a keyway 226 formed in the substrate 220. In an embodiment, the bearing registration feature 224 of the superhard bearing elements 208, 212 may be completely defined by the substrate 220 so that the superhard table 218 is substantially symmetrical (e.g. the generally circular periphery 223), while the substrate 220 is asymmetrical. The substrate 220 may be generally cylindrical and may have a diameter substantially equal to that of the superhard table 218, except for the region serving as the bearing registration feature 226.

Figure 2F:
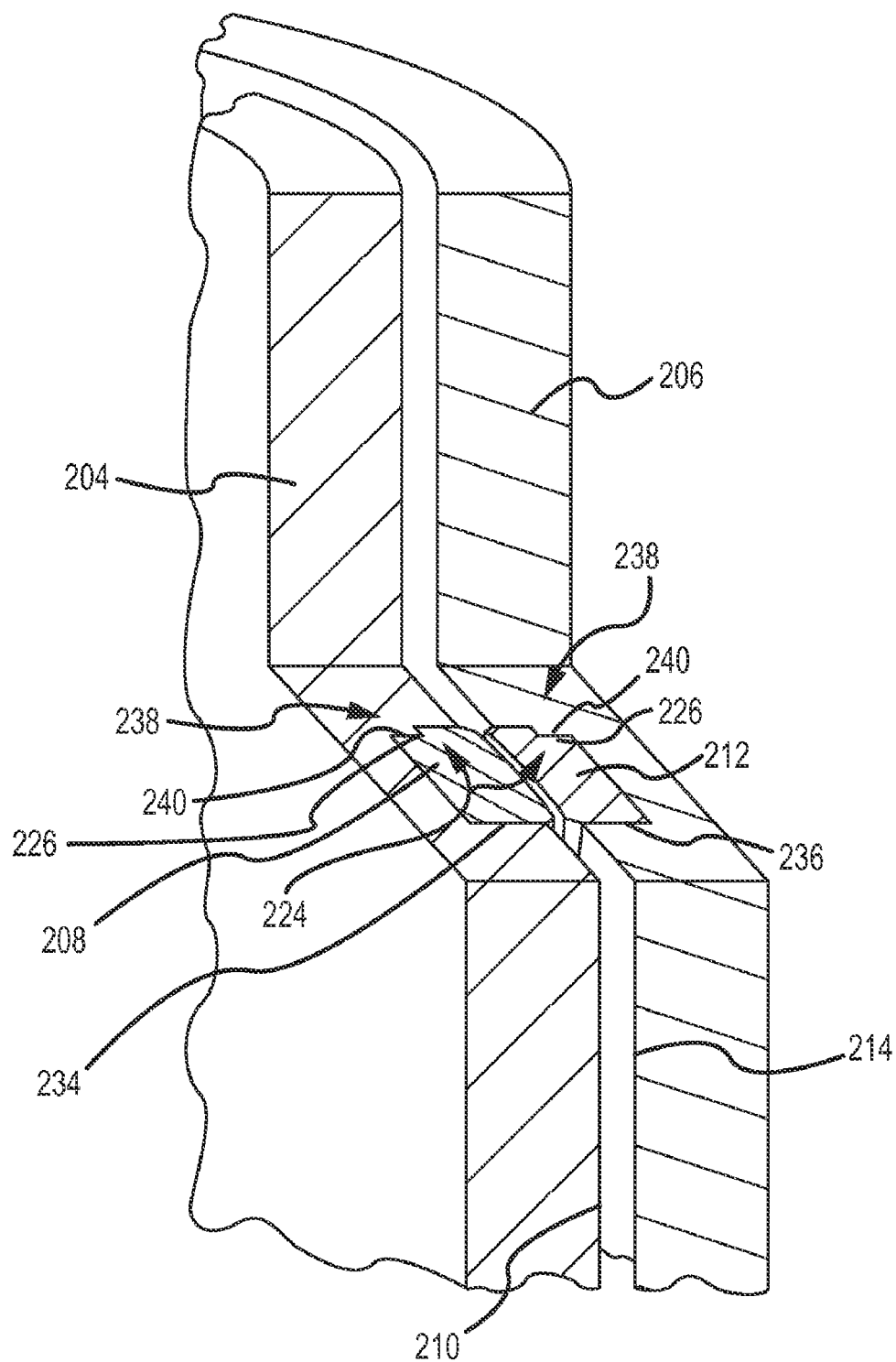
FIG. 2F is partial cutaway isometric view of the radial bearing assembly shown in FIG. 2A according to an embodiment.

Referring to FIG. 2F, each superhard bearing element 208 may be secured within a corresponding one of the recesses 234 of the bearing body 204. Each superhard bearing element 212 is secured within a corresponding one of the recesses 236 of the bearing body 206. At least one, a portion of, or all of the recesses 234, 236 may be partially defined by a recess registration feature 238 (e.g., a key or other bearing-body registration feature) configured to correspond to the bearing registration feature 224 formed in the superhard bearing elements 208, 212. The recess registration feature 238 receives the bearing registration feature 224 of the superhard bearing elements 208, 212 so that the respective axes of curvatures of the curved bearing surfaces 222 are substantially parallel to the axis of rotation 202 (FIG. 2A). In the illustrated embodiment, the recess registration features 238 are keys 240. Each key 240 may partially define a corresponding one of the recesses 236, 238 and may be received by a corresponding one of the bearing registration features 224 (e.g., keyways).

In another embodiment, the bearing registration features 224 may be configured as keys and the recess registration features 238 may be configured as keyways. In another embodiment, the recess registration features 238 may be embodied as marks adjacent each recess 236, 238 and the registration indicators 224 may be embodied as corresponding marks on the superhard bearing elements 208, 212. The marks on the superhard bearing elements 208, 212 may be visually aligned with the marks adjacent the recesses 236, 238 to enable proper orientation of the curved bearing surfaces 222 with respect to the axis of rotation 202.

More generally, the bearing registration features and/or the bearing-body registration features may comprise a mechanical-alignment structure other than those illustrated in FIGS. 2A-2F. For example, the bearing registration features and/or the bearing-body registration features may comprise protrusions, pins, combinations thereof, or other suitable mechanical-alignment structure.

Figure 3A:
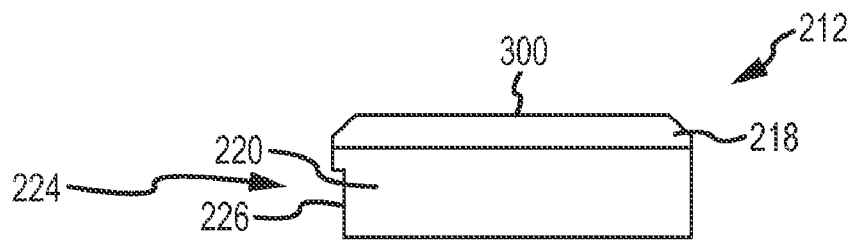
FIGS. 3A-3E are partial side views a radial bearing assembly during fabrication according to an embodiment.

FIGS. 3A-3E illustrate various embodiments for fabricating the bearing assembly 212 in a manner to reduce cracking of the superhard table 218 of the superhard bearing elements 208, 212. The method illustrated in FIGS. 3A-3E shows a superhard bearing element 212. The method may be the same or similar for the superhard bearing elements 208, except convex bearing surfaces, rather than concave bearing surfaces, are formed. Referring specifically to FIG. 3A, at an initial stage, the superhard table 218 may have a generally planar upper surface 300. However, the table 218 may have either a convex or concave surface that is substantially different from the finished cylindrical bearing surface 222.

Figure 3B:
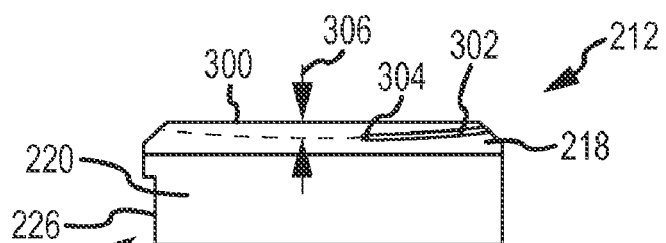

Referring to FIG. 3B, a curved bearing surface 302 (e.g., a generally cylindrical or a generally spherical surface) having a first radius of curvature may be formed using EDM, grinding, formed in situ during high-pressure/high-temperature processing to form the superhard bearing element 212 (e.g., high-pressure/high-temperature processing diamond powder on a cobalt-cemented tungsten carbide substrate), combinations of the foregoing, or another suitable material removal and/or formation process. In the illustrated embodiment, an EDM process is shown in which a highly-charged wire 304 may be passed through the material of the superhard table 218. Material is removed as a result of electrical arcing between the superhard table 218 and the EDM wire 304. In an embodiment, the wire 304 removes material at this stage at a distance 306 from the initial upper surface 300 that may be greater than a width of the kerf produced by the EDM wire 304 (i.e., width of the groove made by the EDM wire 304) in order to remove as much material as possible in a single step.

Figure 3C:
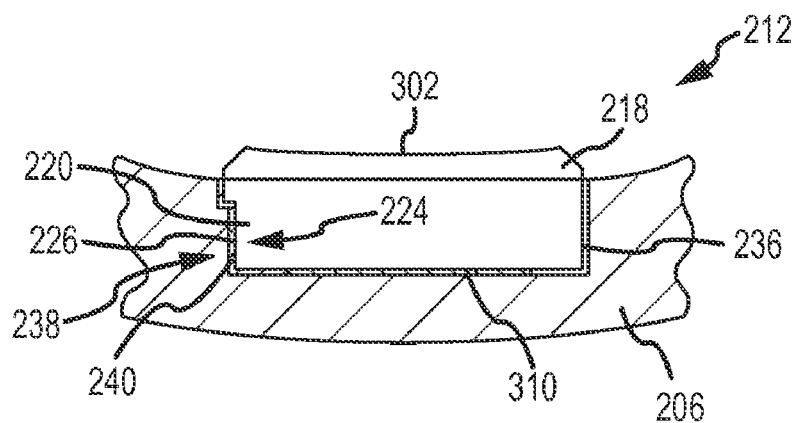

Referring to FIG. 3C, the superhard bearing element 212 may then be positioned within the recess 236. Although the illustrated superhard bearing element 212 includes one of the bearing registration features 226, the curved bearing surface 302 may be positioned relative to the axis of rotation 202 (FIG. 2A) by an external fixture or another suitable technique. In the illustrated embodiment, a quantity of braze filler material 310 (e.g., a brazing preform) may be placed within the recess 234 prior to positioning the superhard bearing element 212 within the recess 236. In such an embodiment, the superhard bearing element 212 is brazed within the recess 236 by heating the assembly illustrated in FIG. 3C until the filler material 310 at least partially melts and flows into the open spaces between the superhard bearing element 212 and the bearing body 206 due to one or both of capillary action and pressure applied to the superhard bearing element 212. In other embodiments, the superhard bearing element 212 may be secured within the recess 236 by soldering, shrink-fitting, press-fitting, gluing, or another suitable joining technique.

In some embodiments, the relative position and geometry of the preformed, curved bearing surface 302 may be sufficiently retained after securing the superhard bearing element 212 within the recess 236 and to the bearing body 206. In such an embodiment, an axis of curvature of the curved bearing surface 302 may be substantially parallel to the axis of rotation 202 (FIG. 2A) and bearing assembly shown in FIG. 3C may be used without further machining of the curved bearing surface 302 to define the geometry and/or position thereof. However, in other embodiment, the process of securing the superhard bearing element 212 to the bearing body 206 may alter the configuration of the curved bearing surface 302 due to, for example, thermal-induced residual stresses resulting from the brazing process used to join the superhard bearing element 212 to the bearing body 206. Therefore, referring to FIG. 3D, in an embodiment, material may then be removed from the curved bearing surface 302 and therebelow to form the finished curved bearing surface 222 having a second radius of curvature, shown in FIG. 3E, which may be greater than, less than, or about equal to the first radius of curvature of the curved bearing surface 302. An axis of curvature of the finished curved bearing surface 222 may be substantially parallel to the axis of rotation 202 (FIG. 2A).

In some embodiments, the first radius of curvature of the curved bearing surface 302 is as close as possible to the second radius of curvature of the finished curved wear surface 222. For example, the first radius of curvature may differ from the second radius of curvature of the finished curved bearing surface 222 by an amount less than or equal to the minimum tolerance achievable using the EDM wire and any actuating mechanism for moving the EDM wire. In some embodiments, all points on the curved wear surface 302 lie within a distance that is less than or equal to the minimum positioning tolerance of the EDM wire and any actuating mechanism for moving the EDM wire. In an embodiment, the first radius of curvature of the curved bearing surface 302 may be selected so that the alteration of the configuration of the curved bearing surface 302 due to thermal-induced residual stresses resulting from the brazing process is close to the desired second radius of curvature of the finished curved wear surface 222.

In some embodiments, the difference between the curved bearing surface 302 and the finished curved bearing surface 222 position and/or configuration may be large enough to compensate for manufacturing tolerances affecting the position of the outer surface of the superhard bearing element 212, such as variation in the size and depth of the recess 236, variation in the position and orientation of the superhard bearing element 212 within the recess 236, variation in the position of the bearing registration feature 224 and the recess registration feature 240, variation in the size of the substrate 220 and superhard table 218, variation in the brazing process, and the like. However, the difference between the curved bearing surface 302 and finished curved wear surface 222 may be less than the kerf of the EDM wire.

The finished curved bearing surface 222 may be formed using grinding, EDM, combinations thereof, or other like or suitable method. In the illustrated embodiment, an EDM wire 304 is used. In an embodiment, the EDM wire 304 removes material within a distance 312 from the curved surface 302 that is less than or equal to the width of the kerf of the EDM wire such that stress concentrations that may lead to crack formation are avoided.

Figure 3D:
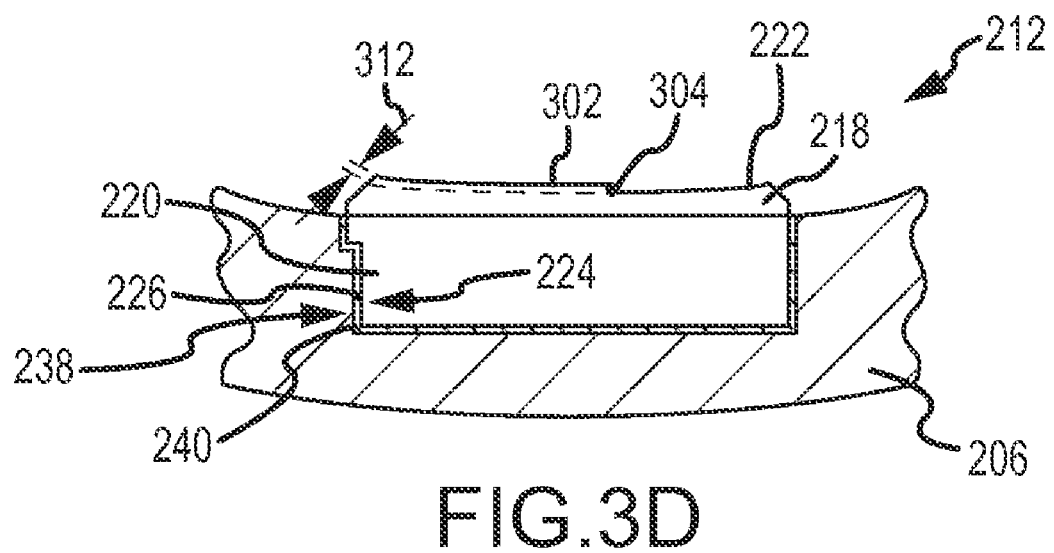
Figure 3E:
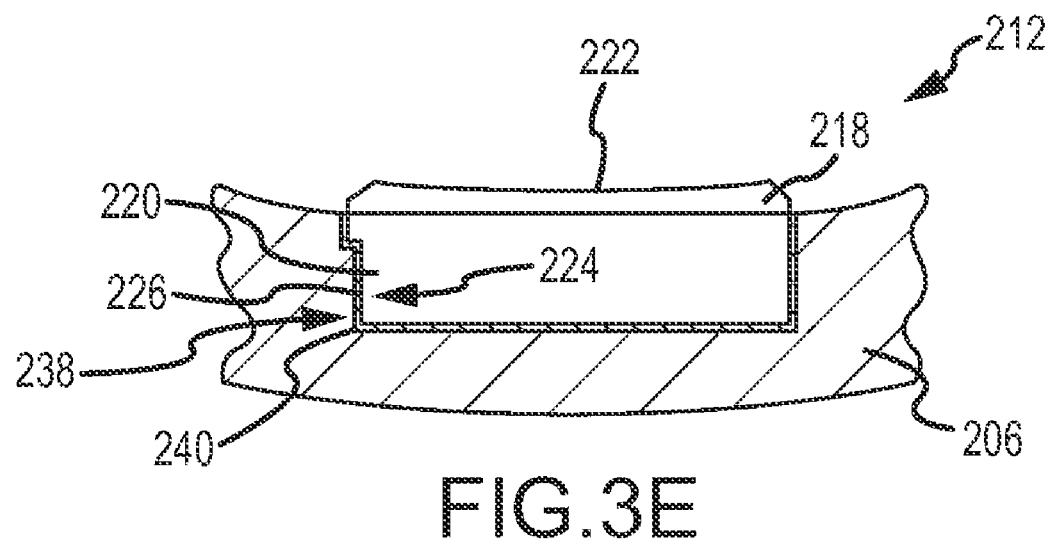

In embodiments where the bearing registration features and the recess registration features are embodied as marks on the superhard bearing elements 208, 212 and bearing bodies 204, 206, respectively, the material removed as illustrated in FIG. 3D may be effective to remove a mark placed on the superhard table 218 to facilitate alignment prior to the joining process.

Inasmuch as the superhard table 218, substrate 220, and bearing bodies 204, 206 all have different coefficients of thermal expansion, residual stresses may be created at the interfaces between and in the different materials as a result of heating and cooling during the brazing process. Experiments conducted by the inventor have shown that following brazing, performing EDM cuts at depths greater than the kerf width may result in catastrophic cracks and may also cause smaller cracks, which, though not catastrophic, may shorten the useful life of the superhard bearing element 208, 212. These cracks are believed to be the result of relieving such residual stresses in the superhard table 218 and the stress concentration developed in the superhard table 218 at the small radius at the leading edge of a cut produced therein using the EDM wire. Therefore, by forming the finished curved bearing surface 222 in a material removal process in which a comparatively small amount of material may be removed from the superhard table 218, the incidence of cracks formed in the superhard table 218 may be reduced or even substantially eliminated so that the durability of the superhard bearing elements 208, 212 may be improved.

Figure 4:
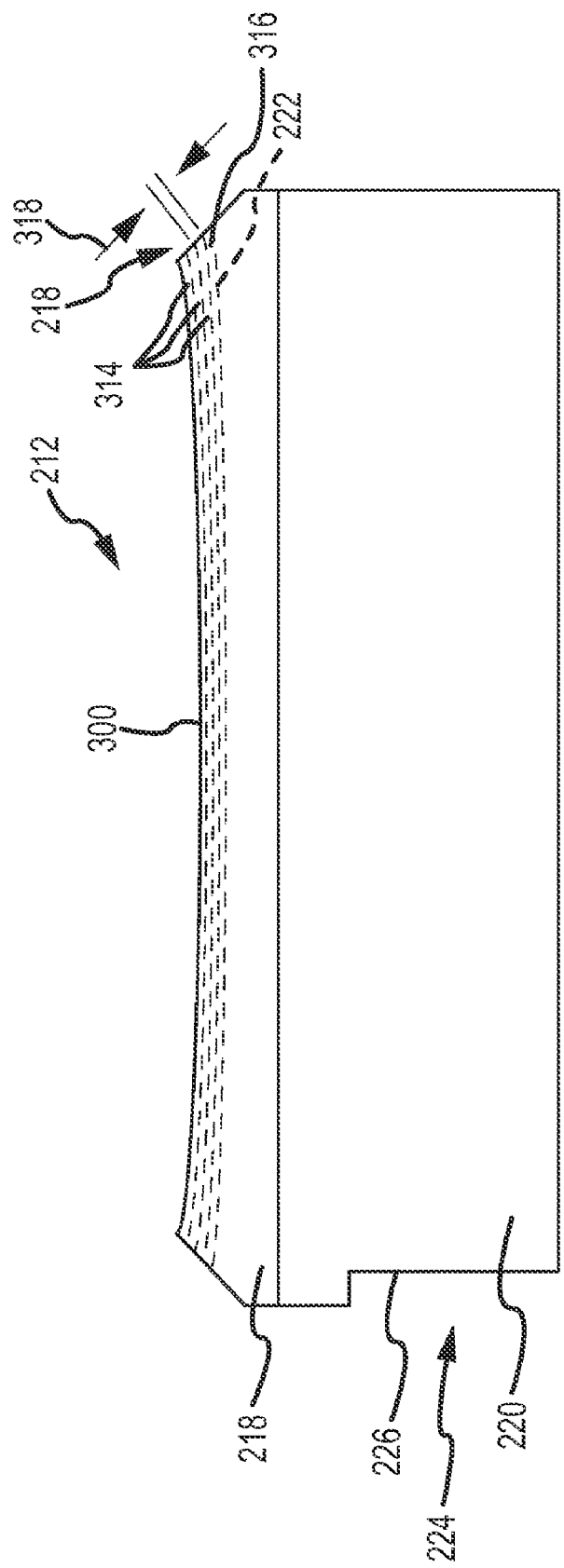
FIG. 4 is a side view illustrating a superhard bearing element during fabrication according to an embodiment.

Referring to FIG. 4, in another embodiment, the superhard table 218 may be transformed from having the planar upper surface 300 or other surface geometry to the finished curved bearing surface 222 by successively removing layers 314 of material from the superhard table 218. A last layer 316 of material may be removed following a brazing step, such as illustrated in FIG. 3C, in order to accommodate dimensional, positional, and process variation. The layers 314 may be removed either before or after the superhard bearing elements 212 are brazed to the bearing body 206. The layers 314, 316 may each removed by an EDM wire 304 and may have a largest thickness 318 that is less than or equal to the kerf of the EDM wire 304, such as less than or equal to about 0.025 inches, less than or equal to about 0.020 inches, less than or equal to about 0.012 inches, or about 0.010 inches to about 0.015 inches.

Figure 5:
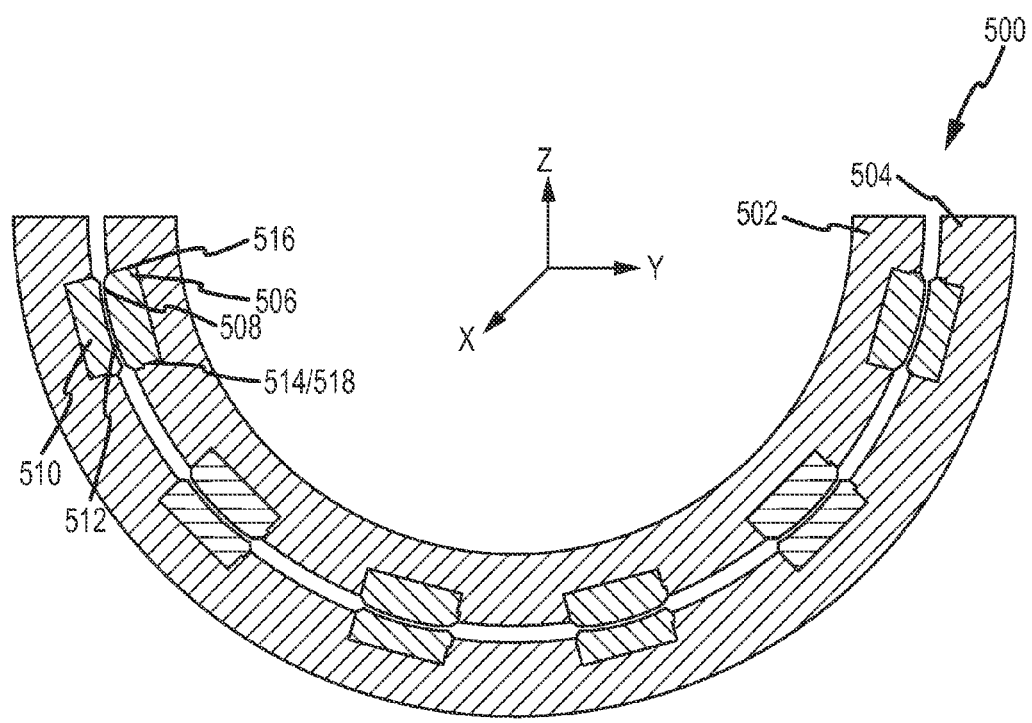
FIG. 5 is a cross-sectional view of a spherical angular contact bearing apparatus according to an embodiment.

Referring to FIG. 5, in addition to radial bearing assemblies and apparatuses, the principles of the radial bearing apparatus 200 shown in FIG. 2A may be employed in an angular contact bearing apparatus that is configured to carry radial loads and thrust loads. FIG. 5 is a cross-sectional view of a spherical angular contact bearing apparatus 500 according to an embodiment. The bearing apparatus 500 includes an inner bearing body 502 and an outer bearing body 504. The bearing body 502 is received by the bearing body 504, and the bearing body 502 and bearing body 504 are configured to move relative to each other. For example, the bearing body 502 may be independently rotatable about three mutually orthogonal axes X, Y, and Z and connected to, for example, an output shaft of a motor and the bearing body 504 may be stationary or vice versa.

A plurality of superhard bearing elements 506 may be mounted to the bearing body 502. Each of the superhard bearing elements 506 may include a convex bearing surface 508 that generally lies on an imaginary spherical reference surface and is oriented to carry thrust and radial loads. A plurality of superhard bearing elements 510 may be mounted to the bearing body 504. Each of the superhard bearing elements 510 may include a concave bearing surface 512 that generally lies on an imaginary spherical reference surface and is oriented to carry thrust and radial loads. The superhard bearing elements 506 and 510 may each include a bearing registration feature 514 (only labeled on the superhard bearing elements 506) and recesses 516 (only labeled on the bearing body 502) in which each superhard bearing element 506 and 510 are received may include correspondingly configured bearing body registration features 518. For example, each superhard bearing element 506 and 510 may including a substrate (not shown) comprising one of the bearing registration features 514, such as a keyway.

The superhard bearing elements 506 and 510 may be fabricated, mounted to the bearing bodies 502 and 504, and, if desired, further processed such as with finish machining in the same or similar manner described above with respect to the embodiments shown in FIGS. 3A-3E and 4.

In another embodiment, a conical angular contact bearing apparatus may be provided. In such an embodiment, each convex bearing surface 508 may be convex conically shaped and generally lie on an imaginary conical surface and each concave bearing surface 512 may also be concave conically shaped and generally lie on an imaginary conical surface.

Figure 6A:
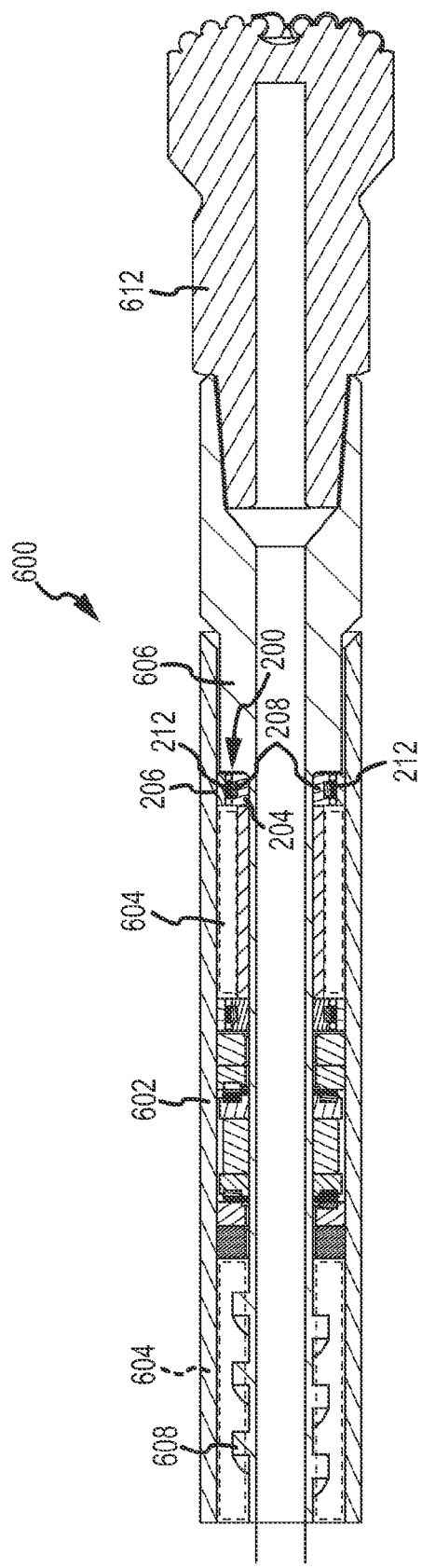
FIG. 6A is a side cross-sectional view illustrating a subterranean drilling system incorporating a radial bearing apparatus according to an embodiment.
Figure 6B:
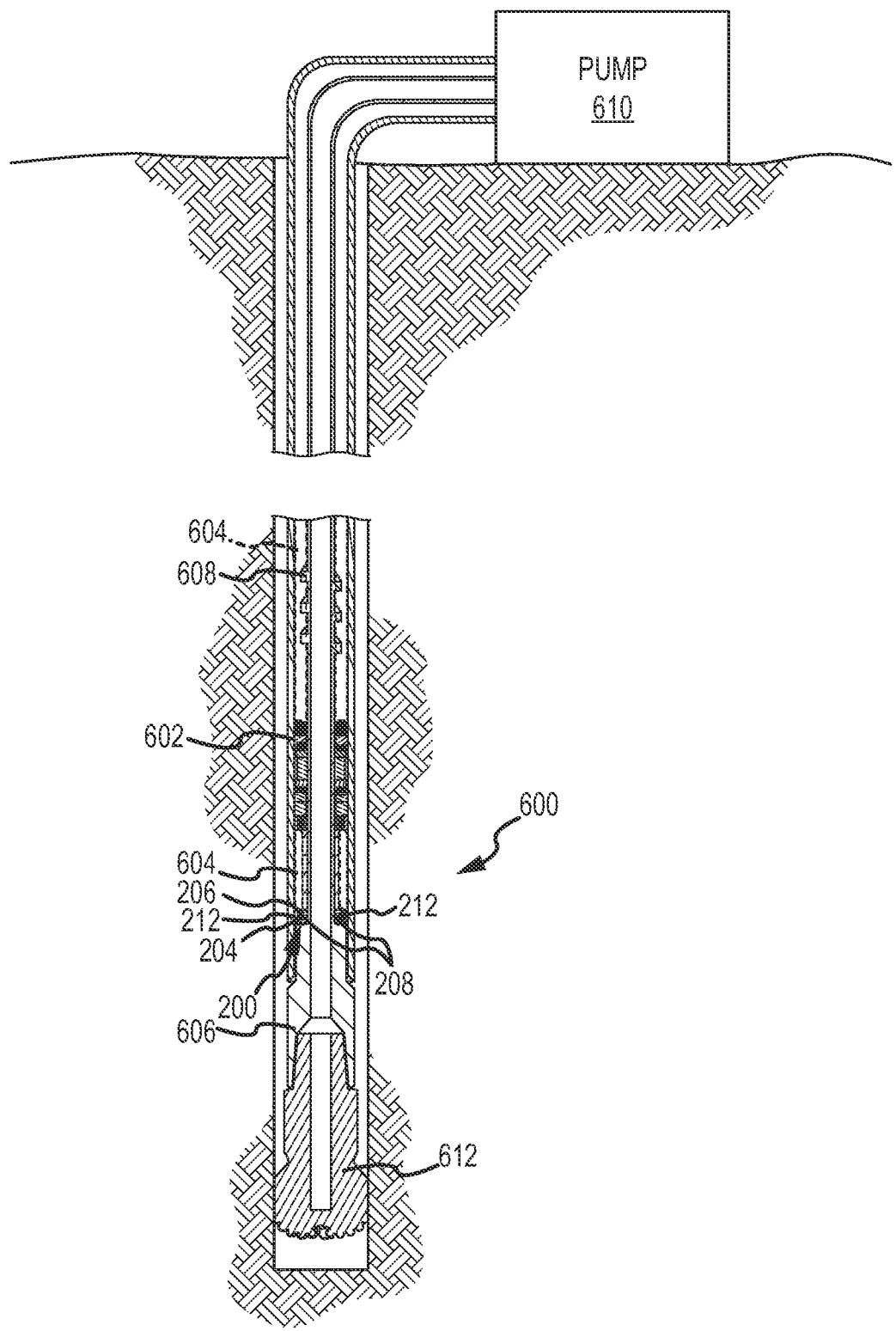
FIG. 6B is a side cross-sectional view illustrating the subterranean drilling system of FIG. 6A during use.

FIGS. 6A and 6B illustrate a subterranean drilling system 600 according to an embodiment, which may incorporate one or more of the disclosed bearing assemblies. The subterranean drilling system 600 may include an outer shaft 602 enclosing a downhole drilling motor 604 that is operably connected to an output shaft 606. The drilling motor 604 may include drive elements 608 that are capable of converting motion of a drilling fluid into rotational motion. For example, the drive elements 608 may be embodied as positive displacement motor elements, vanes, turbine blades, or the like, coupled to the output shaft 606. The drive elements 608 are driven by pressurized slurry supplied by a pump 610 (FIG. 6B). The pump 610 is typically positioned above ground.

One of the radial bearing apparatuses 200 is operably coupled to the downhole drilling motor 604 to support rotation of components of the motor 604 relative to the housing 602. A rotary drill bit 612 configured to engage a subterranean formation and drill a borehole is connected to the output shaft 606. For example, the rotary drill bit 612 may be a roller-cone bit including a plurality of roller cones, a fixed-cutter rotary drill bit, or another suitable rotary drill bit. As the borehole is drilled, pipe sections may be connected to the subterranean drilling system 600 to form a drill string capable of progressively drilling the borehole to a greater depth within the earth.

The bearing body 206 of the radial bearing apparatus 200 may be fixed relative to the housing 602 whereas the bearing body 204 is coupled to the output shaft 606 such that the bearing body 204 rotates with the output shaft 606. The bearing body 206 includes the plurality of superhard bearing elements 212 and the bearing 204 includes the plurality of superhard bearing elements 208, which may be formed and mounted within the bearing body 206 and bearing body 204 according to methods described hereinabove.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various other mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method for forming a bearing assembly, comprising:
    forming a curved major surface on at least one of a plurality of superhard bearing elements, wherein the at least one of the plurality of superhard bearing elements comprises at least one bearing registration key or at least one bearing registration keyway;
    providing a bearing body including at least one recess therein comprising at least one complementary registration feature generally corresponding to the at least one bearing registration key or the at least one bearing registration keyway of the at least of the plurality of superhard bearing elements;
    after the act of forming the curved major surface, inserting the at least one of the plurality of superhard bearing elements into the at least one recesses of the bearing body so that the at least one bearing registration key or at least one bearing registration keyway is in substantial registry with the at least one complementary registration feature;
    after the act of inserting, mounting the at least one of the plurality of superhard bearing elements to the bearing body; and
    after the act of mounting, removing material from the at least one of the plurality of superhard bearing elements via a wire electrical discharge machining ("EDM") process at a distance from the curved major surface thereof that is less than an EDM kerf of the wire EDM process.

2. The method of claim 1 wherein forming a curved major surface on at least one of a plurality of superhard bearing elements comprises machining the curved major surface.

3. The method of claim 1 wherein forming a curved major surface on at least one of a plurality of superhard bearing elements comprises forming the curved major surface of the at least one of the plurality of superhard bearing elements in a high-pressure/high-temperature fabrication process.

4. The method of claim 1 wherein removing material from the at least one of the plurality of superhard bearing elements via an EDM process at a distance from the curved major surface thereof that is less than an EDM kerf of the wire EDM process comprises removing material from the at least one of the plurality superhard bearing elements to form a finished curved bearing surface thereon.

5. The method of claim 4 wherein the finished curved bearing surface exhibits a second radius of curvature that is greater than, less than, or about equal to a first radius of curvature of the curved major surface exhibited by the at least one of the plurality of superhard bearing elements prior to the act of inserting.

6. The method of claim 4 wherein the curved major surface and the finished curved bearing surface are each a generally cylindrical surface, a generally spherical surface, or a generally conical surface.

7. The method of claim 1 wherein each of the plurality of superhard bearing elements comprises a superhard table bonded to a substrate.

8. The method of claim 7 wherein the superhard table comprises polycrystalline diamond.

9. The method of claim 1 wherein mounting the at least one of the plurality of superhard bearing elements to the bearing body comprises mounting the at least one of the plurality of superhard bearing elements to the bearing body by at least one of brazing, soldering, shrink-fitting, press-fitting, or gluing the at least one of the plurality of superhard bearing elements to the bearing body.

10. The method of claim 1 wherein the at least one bearing registration key or the at least one bearing registration keyway substantially aligns an axis of curvature of the curved major surface with an axis of rotation of the bearing assembly.

11. The method of claim 1 wherein at least a portion of the plurality of superhard bearing elements exhibit a cylindrical geometry.

12. The method of claim 1 wherein mounting the at least one of the plurality of superhard bearing elements to the bearing body comprises mounting the at least one of the plurality of superhard bearing elements to the bearing body by at least one of brazing, soldering, shrink-fitting, press-fitting, or gluing the at least one of the plurality of superhard bearing elements to the bearing body.

13. A method for forming a bearing assembly, comprising:
forming a curved major surface on at least one of a plurality of superhard bearing elements, wherein the at least one of the plurality of superhard bearing elements includes at least one bearing registration feature;
providing a bearing body including at least one recess therein at least partially defined by at least one recess registration feature that corresponds to the at least one bearing registration feature of the at least one of the plurality of superhard bearing elements;
after the act of forming the curved major surface, inserting the at least one of the plurality of superhard bearing elements into the at least one recesses of the bearing body so that the at least one bearing registration feature is in substantial registry with the at least one recess registration feature to thereby substantially align an axis of curvature of the curved major surface with an axis of rotation of the bearing assembly;
after the act of inserting, mounting the at least one of the of the plurality of superhard bearing elements to the bearing body; and
removing material from the at least one of the plurality of superhard bearing elements mounted to the bearing body via a wire electrical discharge machining ("EDM") process at a distance from the curved major surface thereof that is less than an EDM kerf of the wire EDM process.

14. The method of claim 13 wherein the at least bearing registration feature comprises a key or a keyway, and wherein the at least one recess registration feature comprises a key or a keyway.

15. The method of claim 13 wherein mounting the at least one of the of the plurality of superhard bearing elements to the bearing body comprises at least one of brazing, soldering, shrink-fitting, press-fitting, or gluing the at least one of the plurality of superhard bearing elements to the bearing body.

16. A method for forming a bearing assembly, comprising:
forming a curved major surface on at least one of a plurality of superhard bearing elements, wherein the at least one of the plurality of superhard bearing elements includes at least one bearing registration feature;
providing a bearing body including at least one recess therein at least partially defined by at least one recess registration feature that corresponds to the at least one bearing registration feature of the at least one of the plurality of superhard bearing elements;
after the act of forming the curved major surface, inserting the at least one of the plurality of superhard bearing elements into the at least one recesses of the bearing body so that the at least one bearing registration feature is in substantial registry with the at least one recess registration feature;
after the act of inserting, mounting the at least one of the of the plurality of superhard bearing elements to the bearing body; and
removing material from the at least one of the plurality of superhard bearing elements mounted to the bearing body via a machining process.

17. The method of claim 16 wherein the machining process comprises wire electrical discharge machining.

18. The method of claim 16 wherein the at least bearing registration feature comprises a key or a keyway, and wherein the at least one recess registration feature comprises a key or a keyway.

19. The method of claim 16 wherein each of the plurality of superhard bearing elements comprises a superhard table bonded to a substrate.

20. The method of claim 19 wherein the superhard table comprises polycrystalline diamond.

21. The method of claim 16 wherein the at least one bearing registration feature and the at least one recess registration feature cooperate with each other so that an axis of curvature of the curved major surface is substantially aligned with an axis of rotation of the bearing assembly.

22. The method of claim 16 wherein at least a portion of the plurality of superhard bearing elements exhibit a cylindrical geometry.

* * * * *

UNITED STATES PATENT AND TRADEMARK OFFICE
CERTIFICATE OF CORRECTION

| | | |
|---|---|---|
| PATENT NO. | : 8,312,631 B2 | Page 1 of 1 |
| APPLICATION NO. | : 12/536178 | |
| DATED | : November 20, 2012 | |
| INVENTOR(S) | : Timothy N. Sexton | |

It is certified that error appears in the above-identified patent and that said Letters Patent is hereby corrected as shown below:

IN THE SPECIFICATION

In Column 2, Line 48, delete "is partial" and insert -- is a partial --, therefor.

In Column 2, Line 51, delete "views a" and insert -- views of a --, therefor.

In Column 5, Line 27, delete "234" and insert -- 236 --, therefor.

In Column 7, Line 5, delete "each" and insert -- each be --, therefor.

In Column 7, Line 43, delete "including" and insert -- include --, therefor.

IN THE CLAIMS

In Column 8, Line 53, delete "least" and insert -- least one --, therefor.

In Column 9, Line 16, delete "plurality" and insert -- plurality of --, therefor.

In Column 10, Line 20, delete "of the of the" and insert -- of the --, therefor.

In Column 10, Line 40, delete "of the of" and insert -- of --, therefor.

In Column 10, Line 48, delete "least" and insert -- least one --, therefor.

Signed and Sealed this
Twentieth Day of October, 2015

Michelle K. Lee
*Director of the United States Patent and Trademark Office*